Dec. 5, 1933.         J. R. ANGER         1,937,502
DEVICE FOR SECURING A MEMBER ON A CYLINDRICAL SHAFT
Original Filed Feb. 23, 1928
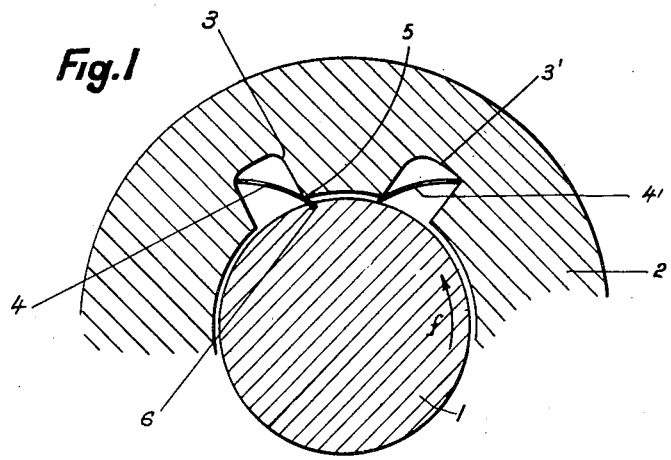
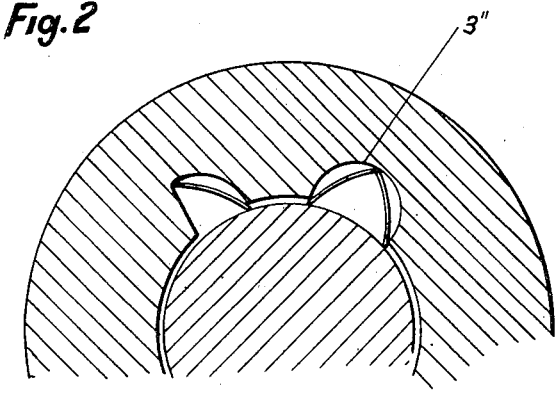
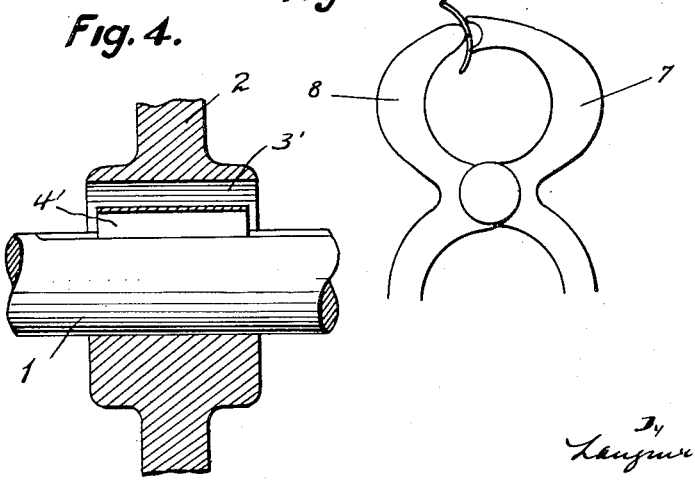
Inventor:
J. R. Anger.

Patented Dec. 5, 1933

1,937,502

UNITED STATES PATENT OFFICE 1,937,502

DEVICE FOR SECURING A MEMBER ON A CYLINDRICAL SHAFT

Jacques Robert Anger, Paris, France

Application February 23, 1928, Serial No. 256,412, and in France March 9, 1927. Renewed March 2, 1933

3 Claims. (Cl. 287—52)

My invention has for its object a simple and inexpensive device for securing a member which may be a sleeve or plate on a shaft. This device is constituted by a recess provided in the inner wall of the outer part and the direction of which is parallel to the common axis of the rotating parts; a flat spring, slightly incurved is disposed in this recess so as to bear on one hand against one of the walls of the recess, the other end of the spring bearing against the shaft. This latter end is moreover supported by one edge of the recess. If the inner part is given a rotary motion in a direction such that it has a tendency to bend the suitably inclined spring, the spring will obviously resist and engage the inner rotating part so as to drive the outer part. Thus the spring acts like a catch which is operative for only one direction of rotation. Obviously it is easy to provide operation in both directions. It is sufficient therefor to use two of the above elementary devices in which the springs are disposed in opposite directions.

The parts are thus reliably and yieldingly secured together without requiring much machining.

The invention has been illustrated by way of example on appended drawing wherein:

Fig. 1 shows diagrammatically a cross section of the keying device.

Fig. 2 illustrates a modified form.

And Fig. 3 shows diagrammatically the tool used for putting the spring keys in place.

Fig. 4 is a longitudinal section of the device shown in Fig. 1 the section plan being a diametral one passing in the middle of recess 3'.

The shaft 1 passes through the sleeve 2 concentric therewith and is designed to drive it. In the inner wall of the sleeve 2 is provided a recess 3 opening inwardly and the longitudinal direction of which is parallel to the common axis of the shaft 1 and of the sleeve 2. In the recess 3 is engaged a spring 4 which is normally flat and which, when in position, bears at one end against an inner angle of the recess 3. The other end bears on shaft 1 which passes through the sleeve 2. The spring is moreover held near this second end by one of the outer edges 5 of the recess 3. The flat spring 4 is slightly bent as its width is slightly greater than the distance between its bearing edges. Thus if shaft 1 rotates in the direction of the arrow f the spring 4 will engage the shaft 1 and make the sleeve 2 rotate with it. For a reverse rotation of the shaft 1, the sleeve 2 will not be driven but the end of spring 4 will slip over the shaft like a catch on the outside of ratchet teeth.

To provide operativeness in both directions it is sufficient to provide another recess 3' containing a spring 4' inclined in the opposite direction. For the direction of rotation of shaft 1 corresponding to the arrow f the spring 4 will cause the driving; for the reverse rotation of shaft 1, the spring 4', on the contrary will ensure the rotation of the sleeve.

The recesses such as 3, 3' may have any suitable shape. However as shown on Fig. 2, it is more advantageous to give them an incurved outline such that if the spring bends, it may bear through all its surface on this curve. The recess of the spring has for instance the shape of a portion of cylinder the axis of which is a generatrix of the inner shaft. When the spring yields it comes against the wall of the recess so that it cannot buckle. The fibres act through compression and their resistance is considerable.

The inclination of the spring with reference to the tangent to the shaft at the point of contact will be preferably near 45°. The sliding of the spring is then impossible, as is also the tearing off of a metal shaving, because this shaving would not have room for clearing.

Fig. 2 shows also a recess 3" containing together two flat springs each adapted to act for a given direction of rotation. It may be considered as formed by two juxtaposed one-spring recesses. Special U-shaped springs may be used for acting for both directions of rotation.

The device described hereinabove is sufficient for ordinary steels which can be scratched by the hard steel of the spring; when however the shaft 1 is made of a particularly hard metal such as a steel alloy, it is preferable (Fig. 1) to provide in advance on this shaft a small groove 6 at the place where it is desired to connect the spring with it.

The putting in place of the spring in its recess is a rather difficult operation by reason of the spring being larger than its recess and of its great length. The spring may be advantageously and conveniently put in place by a special tool constituted by pincers (Fig. 3) of which one of the jaws 7 is recessed according to the curve it is desired to give to the spring 4. By tightening the spring between the jaws 7 and 8 it is given the desired curvature so as to allow its easy insertion in its recess.

What I claim is:

1. A connection comprising a cylindrical shaft, a member having an opening therethrough receiving said shaft, said member having a recess communicating with the opening, said recess having angularly disposed walls, an elongated leaf spring, bowed transversely, and disposed in the recess, and bearing at one longitudinal edge against a wall of the recess adjacent an angle formed by the walls of the recess, said spring bearing at its other longitudinal edge on the shaft, and having a portion intermediate the longitudinal edges thereof contacting the member at the intersection of a wall of the recess and the wall of the opening.

2. A connection comprising a cylindrical shaft, a member having an opening therethrough receiving said shaft, said member having a recess communicating with the opening, said recess having angularly disposed walls, an elongated leaf spring, bowed transversely, and disposed in the recess, and bearing at one longitudinal edge against a wall of the recess adjacent an angle formed by the walls of the recess, said spring bearing at its other longitudinal edge on the shaft, and having a portion intermediate the longitudinal edges thereof contacting the member at the intersection of a wall of the recess and the wall of the opening, and a second spring similar to the first mentioned spring, and mounted in a manner similar thereto, but inclined in the opposite direction with reference to the shaft.

3. A connection comprising a cylindrical shaft, a member having an opening therethrough receiving said shaft, said member having a recess communicating with the opening, the said shaft having a groove therein opposite the said recess, said recess having angularly disposed walls, an elongated leaf spring, bowed transversely, and disposed in the recess, and bearing at one longitudinal edge against a wall of the recess adjacent an angle formed by the walls of the recess, said spring bearing at its other longitudinal edge in the said groove in the shaft, and having a portion intermediate the longitudinal edges thereof contacting the member at the intersection of a wall of the recess and the wall of the opening.

JACQUES ROBERT ANGER.